(12) United States Patent
Lee

(10) Patent No.: US 6,351,527 B1
(45) Date of Patent: Feb. 26, 2002

(54) METHOD OF SECURED REDIALING

(75) Inventor: Seong-Ku Lee, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/425,365

(22) Filed: Oct. 22, 1999

(30) Foreign Application Priority Data

Oct. 22, 1998 (KR) .............................. 98-44302

(51) Int. Cl.7 ...................... H04M 1/272; H04M 1/677; H04M 3/424
(52) U.S. Cl. ........................... 379/209.01; 379/216.01; 379/355.02; 379/355.05; 379/189
(58) Field of Search .................... 379/201, 207, 379/209, 216, 355, 356, 201.01, 209.01, 216.01, 355.01, 355.02, 355.05, 356.01, 188, 189, 190

(56) References Cited

U.S. PATENT DOCUMENTS 4,277,651 A * 7/1981 Fisher, II et al. ........... 379/355
4,593,157 A * 6/1986 Usdan .................... 379/355 X \* cited by examiner

*Primary Examiner*—Harry S. Hong
(74) *Attorney, Agent, or Firm*—Dilworth & Barrese, LLP

(57) ABSTRACT

An apparatus and method for secured redialing in a telephone is disclosed. The redial feature is made secure by establishing a prescribed time for storing in memory a last number dialed. Once the prescribed time has elapsed, the number is erased from the telephone memory. The apparatus and method can also prevent storing in memory the last dialed number.

5 Claims, 3 Drawing Sheets

METHOD OF SECURED REDIALING

BACKGROUND OF THE INVENTION

1. Field of the Invention

The present invention relates to telephone apparatus and an associated method of secured redialing in a telephone.

2. Description of the related art

Redial is a well-known telephone function that automatically recalls from memory and redials the last number called. This function is usually invoked by pressing a redial button. While this feature provides convenience to a user, there is a serious drawback in that the last number called is stored in the memory of the phone, so that any person with access to the phone can redial it, or learn the number through a display provided in the phone. Hence, it often occurs that even secret numbers such as those required for tele-banking, for example, may be inadvertently displayed.

SUMMARY OF THE INVENTION

It is an object of the present invention to provide a method of secured redialing in a telephone.

It is another object of the present invention to provide a method of setting a predetermined time during which the redial function will redial the last number called, and automatically delete the last number called from memory when the predetermined time elapses.

According to the present invention, a method of secured redialing in a telephone including a memory, generally comprises the steps of setting a predetermined time during which a last number called will be retained in the telephone memory, and storing the last number called into the memory for the predetermined time.

The present invention will now be described more specifically with reference to the drawings attached only by way of example.

BRIEF DESCRIPTION OF THE ATTACHED DRAWINGS

DETAILED DESCRIPTION OF THE PREFERRED EMBODIMENT

Throughout the drawings detailed descriptions of the conventional components of a telephone are omitted as they are not essential to the invention and would therefore detract from describing the present invention.

Figure 1:
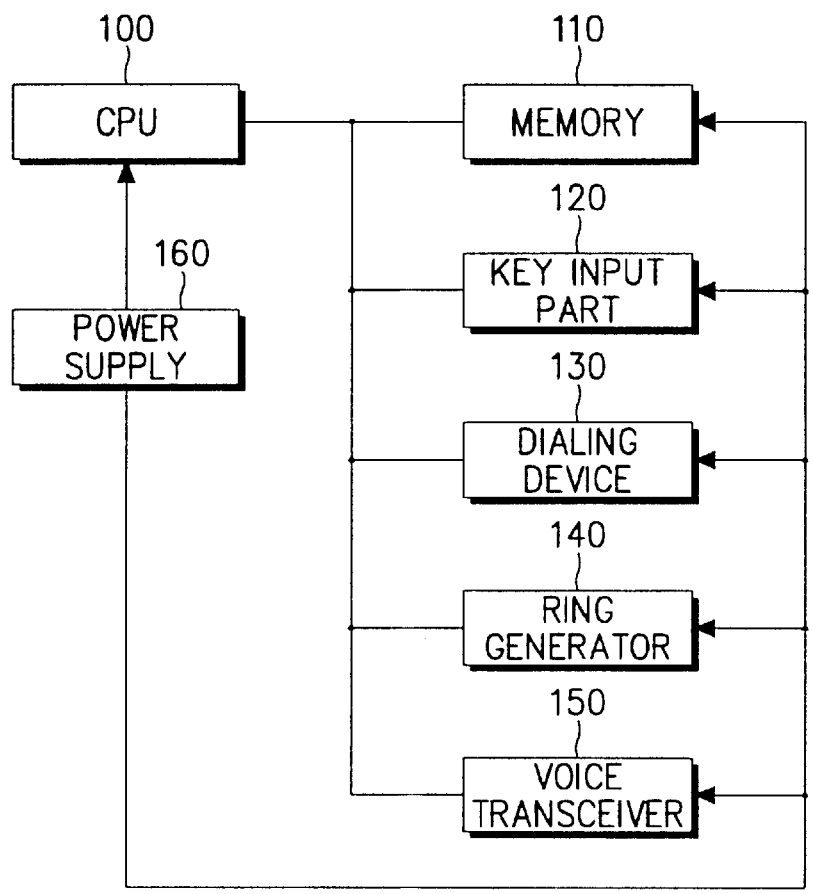
FIG. 1 is a block diagram for illustrating the structure of a telephone for the present invention.
Figure 2:
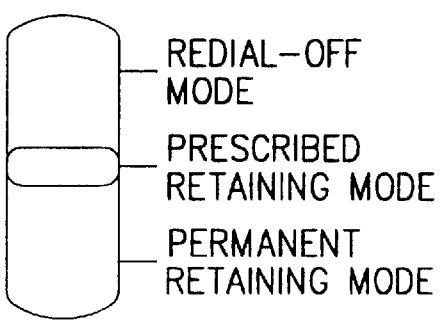
FIG. 2 is an illustration of a switch for setting the time to retain the last number called according to the present invention.

Referring to FIG. 1, the telephone includes a CPU 100, memory 110, key input part 120, dialing device 130, ring generator 140, voice transceiver 150 and power supply 160. The CPU 100 controls all telephone functions including the inventive secured redial function. The telephone also includes a timer to check the time set for redialing the last stored number. The memory 110 stores the program and data necessary to execute the procedures according to FIGS. 3 and 4. In addition, the memory 110 stores the last number called for a prescribed time under the control of the CPU 100. The key input part 120 includes a plurality of numeric keys for dialing together with a redial key. In one embodiment, the key input part 120 may also include a switch for setting the prescribed time to retain the last number called in the memory, as shown in FIG. 2. In this embodiment, the switch has three modes, which include a redial-off mode for suppressing the redialing function, a prescribed retaining mode for retaining the last number called in the memory 110 only for a prescribed time, and a permanent retaining mode for continuously retaining the last number called in the memory 110 until another number is inputted.

The dialing device 130 dials the number inputted through the key input part 120 or retrieved by the redial key from the memory 110 under the control of the CPU 100. The ring generator 140 generates a ring signal. The voice transceiver 150 transmits and receives voice signals. The power supply 160 supplies power to the CPU 100, memory 110, key input part 120, dialing device 130, ring generator 140, and voice transceiver 150. The power supply 160 may be a commercial source obtained through the telephone line or a battery for a cordless or mobile phone.

Figure 3:
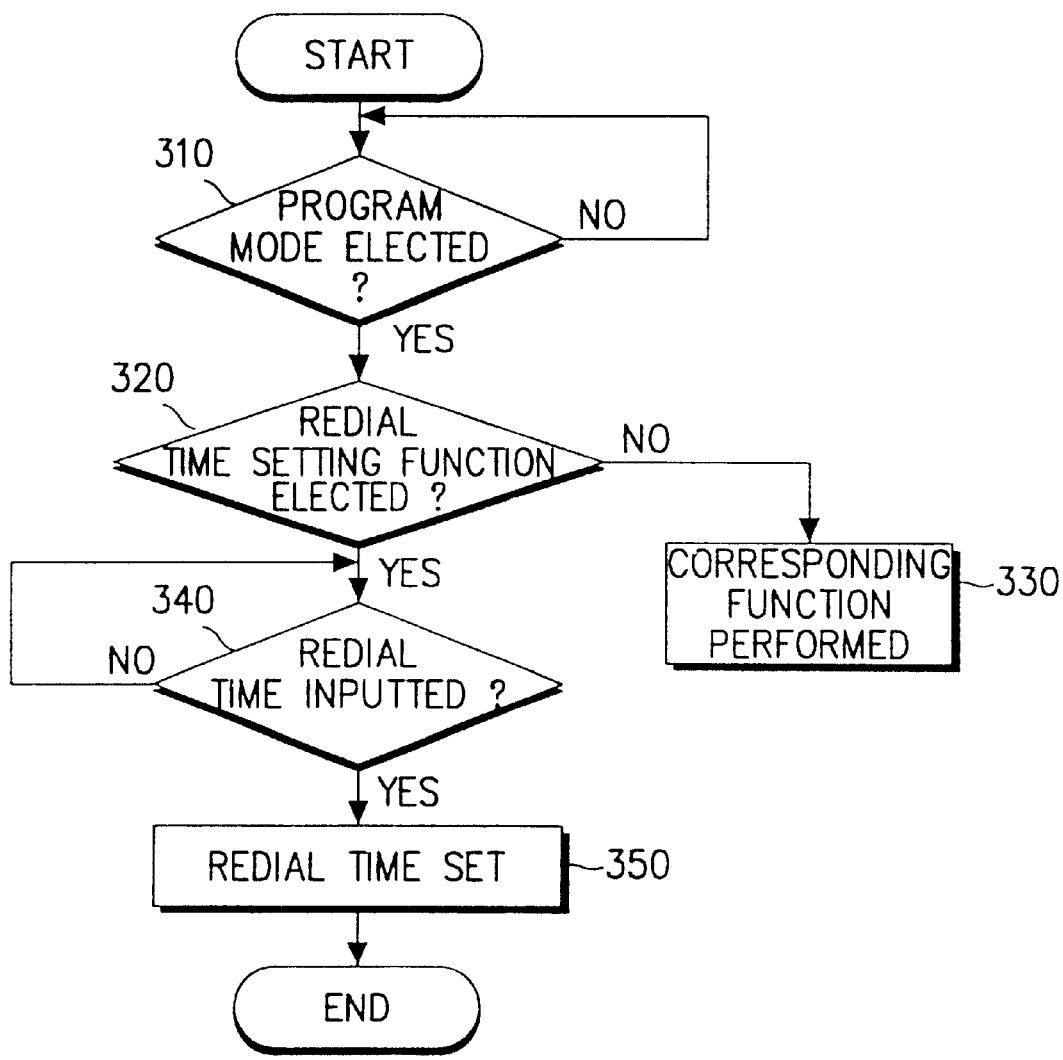
FIG. 3 is a flow chart for illustrating the steps of setting the predetermined time to retain the last number called according to the present invention.

The setting of the prescribed time to retain the last number called will be described with reference to FIGS. 1 and 3. The CPU 100 determines in step 310 whether the program mode is selected by the key input part 120. When the program mode is selected, it is then determined in step 320 whether the function of setting the prescribed time to retain the last number called is selected by the key input part 120. If it is not selected, the CPU 100 performs the corresponding function selected by the key input part 120 in step 330. However, if it is selected, it is determined in step 340 whether the time to retain the last number called is inputted by the key input part 120. When the time for retaining the last number called is inputted, it is set by the CPU 100. For example, if the inputted data is "00", the last number called will not be stored in the memory. If, however, the inputted data is "**", the last number called is retained in the memory until another number is inputted.

Figure 4:
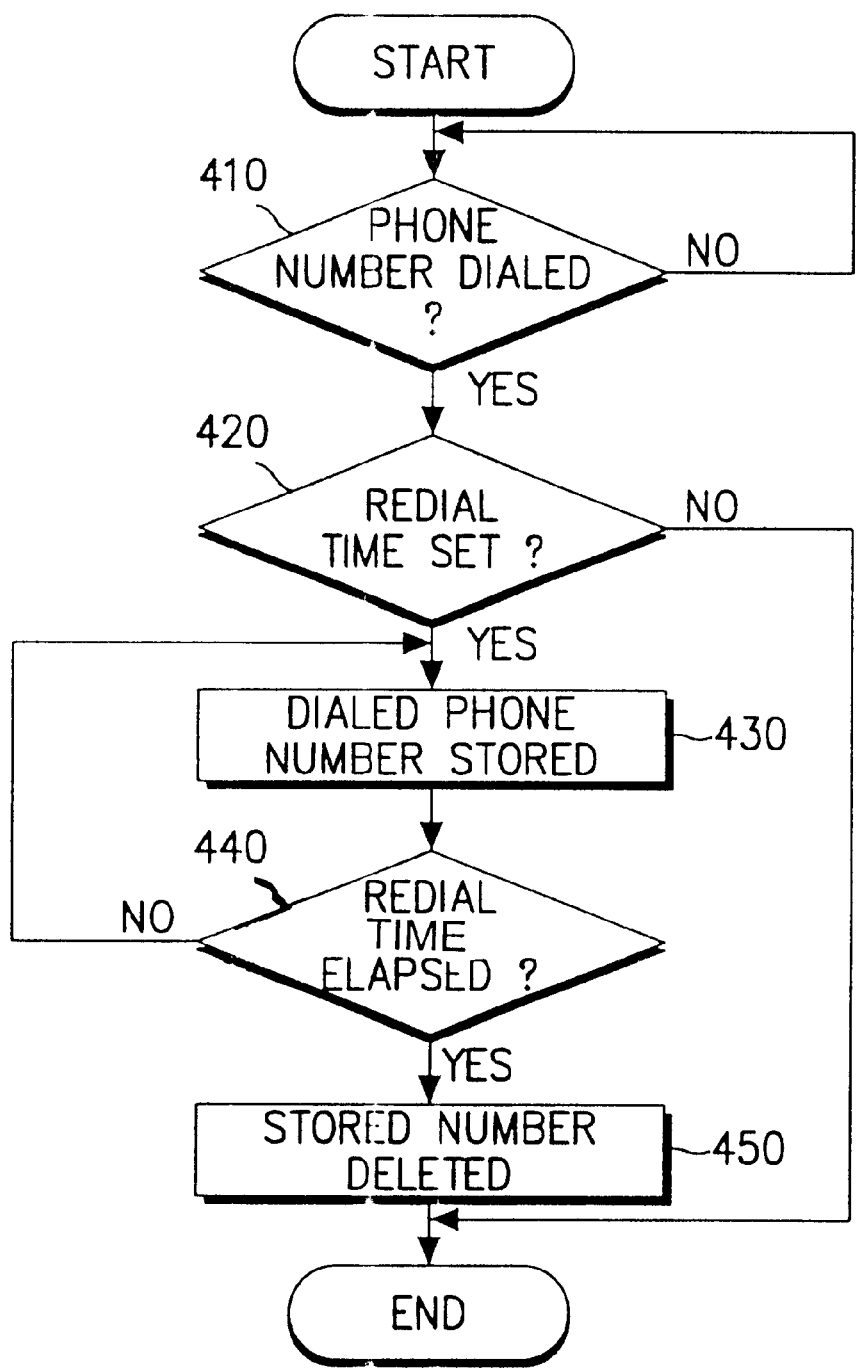
FIG. 4 is a flow chart for illustrating the steps of storing the last number called in the telephone memory according to the present invention.

The process of secured redialing will be described with reference to FIGS. 1 and 4. The CPU 100 determines in step 410 whether a phone number is dialed through the key input part 120. When a phone number is dialed, determining whether a predetermined redial time for retaining the last number called is set in step 420. When the predetermined redial time is set, the dialed phone number is stored into the memory 110 in step 430. The CPU 100 checks by the internal timer whether the predetermined redial time has elapsed in step 440. When the predetermined redial time has elapsed, the CPU 100 deletes the last number called from the memory 110 in step 450. That is, the last number called is retained in the memory 110 only for a prescribed time.

Thus, the user may advantageously retain the last number called in the memory for only a desired time in order to prevent it from being inadvertently exposed. In addition, if the predetermined time is set to "0" for security reasons, the last number called is never stored in the memory.

While the invention is susceptible to various modifications and alternative forms, specific embodiments thereof have been shown by way of example in the drawings and have been described herein in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A method of secured redialing in a telephone including a memory, comprising the steps of:

setting a predetermined time during which a last number called is stored in said memory;

detenmining whether said predetennined time for storing the last number called is set; and storing the last number called into said memory for the predetermined time.

2. A method of secured redialing as defined in claim 1, wherein the step of setting said predetermined time further comprises the steps of:

(i) determining whether a program mode is selected; and (ii) determining whether a secured redialing function is selected while in said program mode;

(iii) receiving said predetermined time from a user as input in said program mode; and (iv) setting the received predetermined time from said user when said secured redialing function is selected.

3. A method of secured redialing as defined in claim 2, wherein the step of setting the predetermined time is performed under program control of a central processing unit (CPU).

4. A method of secured redialing as defined in claim 2, wherein the secured redialing function is controlled by a central processing unit.

5. A telephone adapted for secured redialing, comprising:

a central processor unit (CPU) for controlling the functions of the telephone, said CPU having three modes of operation, including a first mode for suppressing a redial function, a second mode for retaining a last number called in the memory for said predetermined time, and a third mode for continuously retaining the last number called in the memory;

a key input part including a plurality of numeric keys for dialing, and a redial key;

an internal timer for checking whether a predetermined time has elapsed;

a dialing device for dialing numbers inputted through the key input part and from memory via a redial key; and a memory for storing programs and data.

* * * * *